United States Patent
Michelman et al.

(10) Patent No.: US 6,907,580 B2
(45) Date of Patent: *Jun. 14, 2005

(54) SELECTION PARADIGM FOR DISPLAYED USER INTERFACE

(75) Inventors: Eric H. Michelman, Bellevue, WA (US); Patrick Moulhaud, Seattle, WA (US); Daniel L. Tripp, Bellevue, WA (US); Scott M. Isaacs, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

This patent is subject to a terminal disclaimer.

(21) Appl. No.: 09/737,617

(22) Filed: Dec. 14, 2000

(65) Prior Publication Data

US 2002/0075309 A1 Jun. 20, 2002

(51) Int. Cl.[7] .............................. G06F 3/00; G06F 9/00; G06F 17/00
(52) U.S. Cl. .................. 715/856; 715/851; 715/861; 715/711; 715/767; 715/769; 715/780
(58) Field of Search ................................ 345/808, 856, 345/861, 711, 773, 780, 821, 822, 823, 842

(56) References Cited

U.S. PATENT DOCUMENTS

| | | | |
|---|---|---|---|
| 4,686,522 A | | 8/1987 | Hernandez et al. |
| D297,243 S | | 8/1988 | Wells-Papanek et al. |
| 4,885,717 A | | 12/1989 | Beck et al. |
| 4,937,036 A | | 6/1990 | Beard et al. |
| 5,617,114 A | * | 4/1997 | Bier et al. ............... 345/634 |
| 5,745,717 A | * | 4/1998 | Vayda et al. ............. 715/834 |
| 5,828,360 A | * | 10/1998 | Anderson et al. ........ 345/834 |
| 5,874,965 A | * | 2/1999 | Takai et al. .............. 345/667 |
| 6,552,737 B1 | * | 4/2003 | Tanaka et al. ............ 345/781 |

OTHER PUBLICATIONS

"HP Announces Commerce Centre For Asia Pacific". HP Invent Aug. 5, 1998: p. 2.*
"DHTML Basics". Dynamic HTML Mar. 16, 1999: p. 1–2.*
"Microsoft Word 97 for Windows". p. 6.*
Crowcroft, Jon. "Information—Are You Being Served?". May 10, 1995: p. 1 and 4.*
Powell, *Designing User Interfaces*, Levanthal (ed.), Microtrend™ Books, San Marcos, CA, pp. 153–154, 1990.
Lorenz et al., *Windows 3 Companion*, Microsoft Press, Redmond, WA, pp. 14–15, 1990.
Lorenz et al., *Windows 3 Companion*, Microsoft Press, Redmond, WA, pp. 51–52, 1990.
Lorenz et al., *Windows 3 Companion*, Microsoft Press, Redmond, WA, pp. 241–287, 1990.
Lorenz et al., *Windows 3 Companion*, Microsoft Press, Redmond, WA, pp. 461–469, 1990.

(Continued)

Primary Examiner—John Cabeca
Assistant Examiner—Namitha Pillai
(74) Attorney, Agent, or Firm—Klarquist Sparkman LLP

(57) ABSTRACT

A moveable displayed user interface element can be used to select an item displayed on a user interface. Once the proper item or items are selected, an area of the moveable displayed user interface element can be activated to perform an operation on the selected item or items. The moveable displayed user interface element can additionally display information about a selected item, and, in some cases, the displayed information can be edited to modify the selected item. A versatile lightweight system can be used to determine when a moveable object is over any of a number of regions associated with specified targets. The lightweight system can be used to implement moveable displayed user interface elements.

60 Claims, 12 Drawing Sheets

OTHER PUBLICATIONS

Lorenz et al., *Windows 3 Companion*, Microsoft Press, Redmond, WA, pp. 471–500, 1990.

Lorenz et al., "Windows 3 Companion Quick Reference," *Windows 3 Companion*, Microsoft Press, Redmond, WA, pp. 1–5, 1990.

"DBTableView," http://www.channelu.com/NeXT/NeXT-Step/3.3/nd/GeneralRef/04_DatabaseKit/Classes/DB, pp. 1–24, Sep. 4, 2000.

"DHTML Events," http://msdn.microsoft.com/workshop/author/dhtml/reference/events.asp, p. 1, Aug. 31, 2000.

Jacob et al., "A Software Model and Specification Language for Non–WIMP User Interfaces," *ACM Transactions on Computer–Human Interaction*, vol. 6, No. 1, pp. 1–46, Mar. 1999.

Champeon et al., *Building Dynamic HTML GUIs*, IDG Books Worldwide, Inc., Foster City, CA, 1999.

Scheifler et al., "The X Window System," *ACM Transactions on Graphics*, vol. 5, No. 2, pp. 79–109, Apr. 1986.

Myers, "Graphical Techniques in a Spreadsheet for Specifying User Interfaces," *Proceedings SIGCHI'91: Human Factors in Computing Systems*, New Orleans, LA, pp. 243–248, Apr. 28–May 2, 1991.

Lewis, "NoPumpG: Creating Interactive Graphics with Spreadsheet Machinery," *Visual Programming Environments: Paradigms and Systems*, Glinert (ed.), IEEE Computer Society Press, Los Alamitos, CA, pp. 526–546, 1990.

Wilde et al., "Spreadsheet–based Interactive Graphics: from Prototype to Tool," *CHI '90 Proceedings*, pp. 153–159, Apr. 1990.

Berry, "The Designer's Model of the CUA Workplace," *IBM Systems Journal*, vol. 31, No. 3, pp. 429–458, 1992.

Berry et al., "The Evolution of the Common User Access Workplace Model," *IBM Systems Journal*, vol. 31, No. 3, pp. 414–428, 1992.

Galitz, *User–Interface Screen Design*, QED Information Sciences, Inc., Wellesley, MA, pp. 268–269, 1993.

Seybold, "Xerox's 'Star'," *The Seybold Report*, vol. 10, No. 16, p. 16–1, Apr. 27, 1981.

"The Latest Word," *The Seybold Report*, vol. 10, No. 16, p. 16–2, Apr. 27, 1981.

Seybold, "The Xerox 'Professional Workstation'," *The Seybold Report*, vol. 10, No. 16, pp. 16–3 through 16–18, Apr. 27, 1981.

"innerHTML Property," http://msdn.microsoft.com/workshop/author/dhtml/reference/properties/innerhtml.asp, pp. 1–3, Sep. 4, 2000.

"DIV Element DIV Object," http://msdn.microsoft.com/workshop/author/dhtml/reference/objects/DIV.asp, p. 1, Sep. 5, 2000.

"Package com.sas.util.selectors," http://www.sas.com/rnd/appdev/webAF/api/com/sas/util/selectors/package–summary.html, pp. 1–2, Sep. 4, 2000.

"Class ColumnSelector," http://www.sas.com/rnd/appdev/webAF/api/com/sas/util/selectors/ColumnSelector.html, pp. 1–16, Sep. 4, 2000.

* cited by examiner

SELECTION PARADIGM FOR DISPLAYED USER INTERFACE

TECHNICAL FIELD

The invention relates to computer user interfaces, and more particularly to a displayed user interface element moveable about a display.

BACKGROUND OF THE INVENTION

Since the development of the first computer systems, a variety of techniques have been set forth to help human users interface with machines. The science of user interfaces is sometimes called human-computer interaction ("HCI"). Many early systems were based on the exchange of text, such as ASCII characters typed at a keyboard. However, such text-based systems were hampered by a variety of limitations. With the advent of more powerful desktop computers, graphical user interfaces (GUIs) emerged as a superior user interface paradigm and have become more prevalent.

One familiar user interface paradigm presented by many contemporary desktop computers includes windows, icons, menus, and a pointer; it is therefore sometimes called the "WIMP" user interface. Such an interface can be used in a variety of systems for a variety of purposes and is familiar to most contemporary computer users. A typical aspect of the conventional WIMP user interface is the presentation of icons, which can be selected via a pointer. The pointer is manipulated with a pointer manipulation device, such as a mouse or trackball.

However, the conventional WIMP user interface is also hampered by various limitations, and it is not always readily understood by new users. Therefore, there exists a need for better techniques for users to interact with computers.

SUMMARY OF THE INVENTION

The invention includes methods and systems relating to various ways of selecting an item presented on a display and performing an operation on the selected item. For example, a user interface element can be moved about a user interface to select a displayed item. Once the proper item or items are selected, an area on the user interface element can be activated to perform an operation on the selected item or items. The user interface element provides an intuitive and easy-to-use user interface paradigm that can be used on its own or incorporated into other interfaces, such as the conventional WIMP interface.

In one set of embodiments, various user interface elements are provided for performing various operations on displayed items. For example, displayed items can be modified, relocated, or deleted. The user interface element can be moved about the display to select appropriate displayed items. Once the user is satisfied with the selection, she can activate an area displayed within the user interface element to activate the desired function, which is performed on the selection.

In another feature of the invention, the user interface element can be dynamically updated to present information associated with selected items. Such information can be presented before the desired function is activated and in some cases may be edited. For example, properties of a selected item can be presented in a text box, and the properties can be changed by editing the text in the text box.

The described user interface elements are particularly useful in client-server scenarios such as web browsers. For example, a user can edit or customize a web page by using a combination of the user interface elements.

The described user interface elements can be implemented via a described mechanism for indicating when an item has been moved over any of a number of specified regions, which are associated with targets. The mechanism can be extended for use in a variety of situations, including client-server scenarios.

Additional features and advantages of the invention will be made apparent from the following detailed description of illustrated embodiments, which proceeds with reference to the accompanying drawings.

DETAILED DESCRIPTION OF THE INVENTION

The invention is directed to methods and systems related to providing a user interface paradigm. In one embodiment illustrated herein, the invention is used in conjunction with MSN Web Communities provided on the Internet by Microsoft Corporation of Redmond, Wash. Briefly described, Web Communities are a collection of online locations where persons with similar interests can meet and exchange a variety of information.

Exemplary User Interface Elements

Figure 1A:
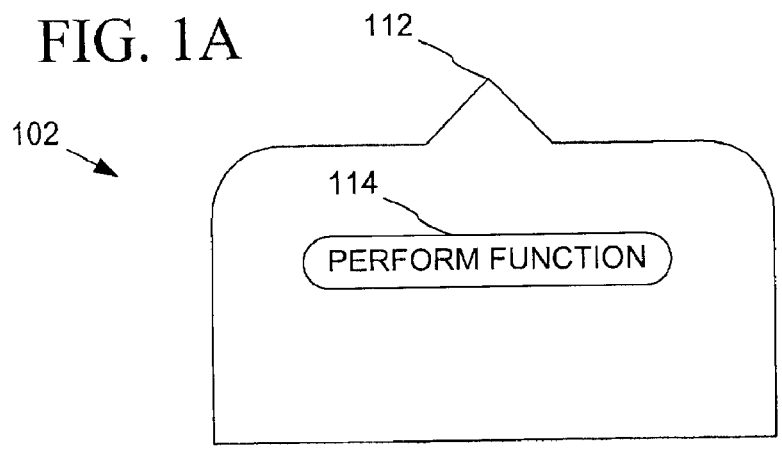
FIG. 1A is an illustration of an exemplary user interface element in accordance with the invention.
Figure 1B:
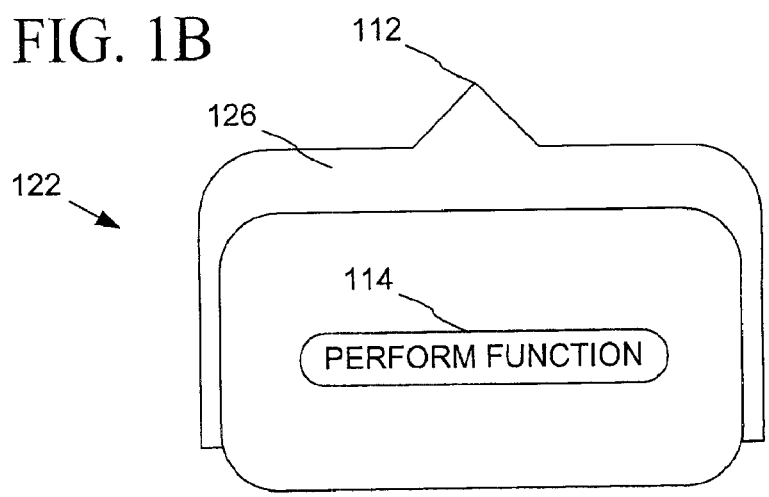
FIGS. 1B and 1C are illustrations of alternative arrangements of user interface elements in accordance with the invention.
Figure 1C:
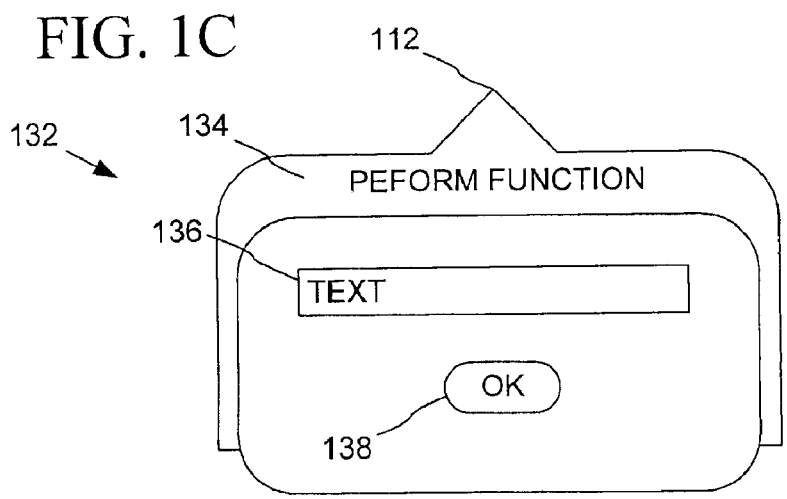

FIGS. 1A–1C show a variety of exemplary moveable displayed user interface elements that can be used to select a set of one or more items and perform an operation on the selected items upon activation of an area on the user interface element.

The illustrated user interface elements can be used in an environment having a displayed user interface, such as a graphical user interface of a desktop computer. For example, FIG. 1A shows a basic user interface element 102 with a pointer 112 and a pushbutton 114. Displayed items can be selected by moving the pointer 112 over an item. After the item is selected, the pushbutton 114 can be activated to perform an operation on the selected item.

Typically, items are unselected when the pointer 112 is moved off the item. Alternatively, items can be unselected when the pointer 112 is moved to another item, or multiple items can be selected in some implementations by moving the pointer 112 over them in turn. To give the user an indication that an item is selected, typically, selected items are portrayed in some emphasized manner (e.g., the item is highlighted).

The shape of the user interface element 102 can vary from that shown. Although the example shown is substantially rectangular, other shapes (e.g., triangular, circular, and the like) can be used.

The user interface element 102 can be moved in a variety of ways. Typically, the element is moved by dragging it (e.g., positioning a graphical pointer over the item in a graphical user interface, clicking a pointing device button, and then moving the graphical pointer with the pointing device) about a displayed area. The element 102 can also be moved via keyboard commands (e.g., up, down, left, and right arrow keys), and, in some cases, the user interface element can be designated as the pointer in a graphical user interface. In such a case, the user interface element 102 is moved simply by manipulating a keyboard or pointing device. The pointing device used to move the element 102 can be any of a number of devices, such as a mouse, trackball, or keypad.

The manner in which selection of displayed items is achieved can also vary from that shown. Although the example achieves selection by positioning the pointer 112 over an item, other methods (e.g., positioning any portion of the element 102 over an item) can be used.

In some alternatives, the keyboard can be used in a variety of ways to position the element 102. For example, in addition to using the arrow keys, the element 102 can be navigated to a number of pre-defined possible positions (or "hot spots") by pressing the tab or some other (e.g., shift tab or enter) key. Another key on the keyboard can be designated for activation (e.g., the enter key).

Although not required, a helpful feature is a description of the action performed when the button 114 is pressed. The description can be displayed anywhere, such as within the user interface element or within the button 114. The description can be a text description (e.g., "delete") or some other description (e.g., an icon or other graphic). The description could also be implicit by using various colored elements (e.g., red for delete) or some other indication.

Presentation of such a description is helpful because the user is informed of the action about to be performed. Thus, for example, some operations (e.g., deletes) need not be explicitly confirmed (e.g., no separate alert need be provided). Confirmation can be built in to the user interface element via the description. The moveable displayed user interface element can thus avoid the error-prone approach of selecting an item without having the operation in mind.

In some arrangements, having a description serves as a proxy for having a separate confirmation step. For example, in some conventional systems, a delete function is selected and a confirmation dialog box is displayed with buttons for "yes" and "no," requiring another action by the user. Confirmation can be avoided if the function (e.g., "delete") is plainly described within the element 102. Such arrangements are thus often more efficient and less prone to confusion and error.

Finally, the manner in which performance of an operation is initiated on the selected displayed items can also vary from that shown. Although a displayed button 114 is shown, other user interface mechanisms (e.g., a checkbox or slider) can be used.

Another example of a user interface element 122 for selecting an item and performing an operation on the item is shown in FIG. 1B. The user interface element 122 includes a separate drag area 126, via which the element 124 can be dragged about a display.

Still another example of a user interface element 132 for selecting an item and performing an operation on the item is shown in FIG. 1C. The element 132 includes a name area 134, which can be used to display the type of function performed by the user interface element 132. Such an arrangement can be particularly useful, for example, in scenarios utilizing multiple user interface elements performing a variety of operations. Displaying a name of the user interface element 132 can assist the user in differentiating which of the user interface elements is displayed.

Also included within the exemplary user interface element 132 is a text box 136. Such an arrangement can be particularly useful, for example, in displaying information about a selected item (e.g., the selected item's name). In some cases, it may be desirable to allow editing of the information displayed in the text box 136 (e.g., to change a selected item's name). In addition to or instead of a text box 136, any of a variety of other user interface elements (e.g., push buttons, radio buttons, toggle buttons, check boxes, combo boxes, drop down menus, sliders, rulers, and the like) can be used alone or in various combinations within the user interface element.

In the illustrated example, the button 138 is used to initiate performance of an action on a selected item. After the action is performed, the user interface element can remain on the display for further operations or disappear.

Although the illustrated examples describe selection with respect to a single item, a user interface element can also be constructed to select multiple items. In addition, some operations may require multiple steps. Various examples of moveable displayed user interface elements are illustrated in further detail below.

Exemplary Method for Use in Conjunction with User Interface Element

Figure 2:
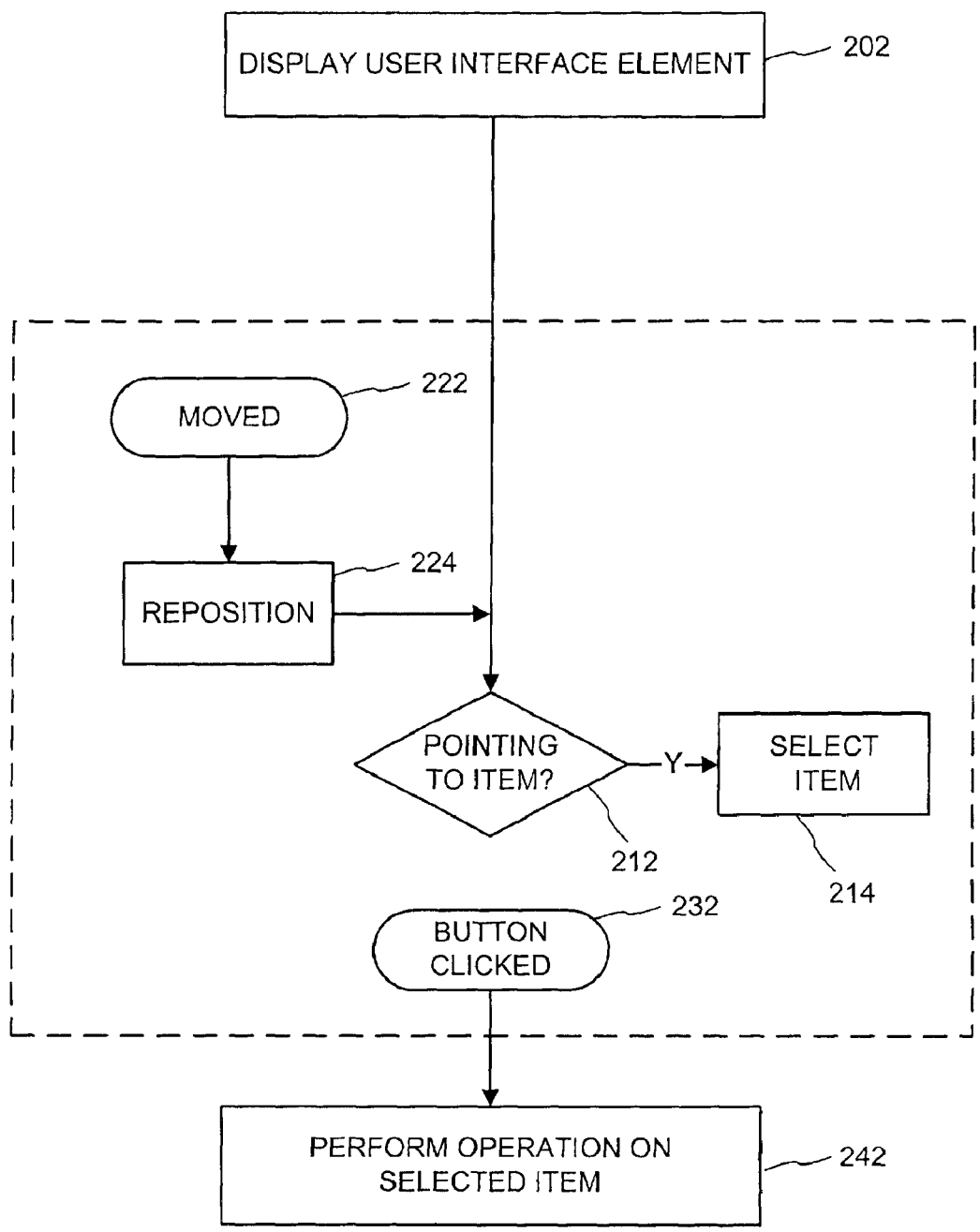
FIG. 2 is a flowchart showing an exemplary method for use with the user interface elements in accordance with the invention.

FIG. 2 shows an exemplary method for use in conjunction with a user interface element such as that of FIG. 1A. Typically, software is provided for activating or creating an instance of the user interface element, at which time the method begins.

At 202, the user interface element is displayed. Then, at 212, it is determined if the user interface element is pointing to an item (e.g., whether the pointer 112 of FIG. 1A is over an item). If so, the item is selected at 214. When the item is selected, a variety of other actions can be initiated. For example, the item can be highlighted (e.g., by changing its color, bolding the item, or the like) to provide feedback to the user, indicating the item is selected. Further, information about the selected item can be displayed in the user interface element. In some cases, there may be a level of indirection between the displayed item and the selected item. For example, the displayed item may be the word "all," and selecting the item selects all items. Or the displayed item may be the word "spell check," and selecting the item selects a spell check function.

If it is detected that the user interface element is to be moved at 222 (e.g., via manipulation of a pointing device), the user interface element is repositioned on the display at 224. It is then again determined whether the user interface element is pointing to an item at 212 and appropriate action taken.

If activation of the activation area (e.g., pushbutton) of the user interface element is detected at 232, performance of a particular operation on the selected item is initiated at 242. The operation can be any of a wide variety of actions or functions. For example, if the items represent documents, the operations can be "edit," "delete," or "rename" operations. If the items represent merchandise, the operations can be "get information" or "buy" operations. If the items are columns in a table, the operations can be "modify," "rename," "delete," "format," "add," or "move" operations.

Exemplary Operation of a User Interface Element

Figure 3:
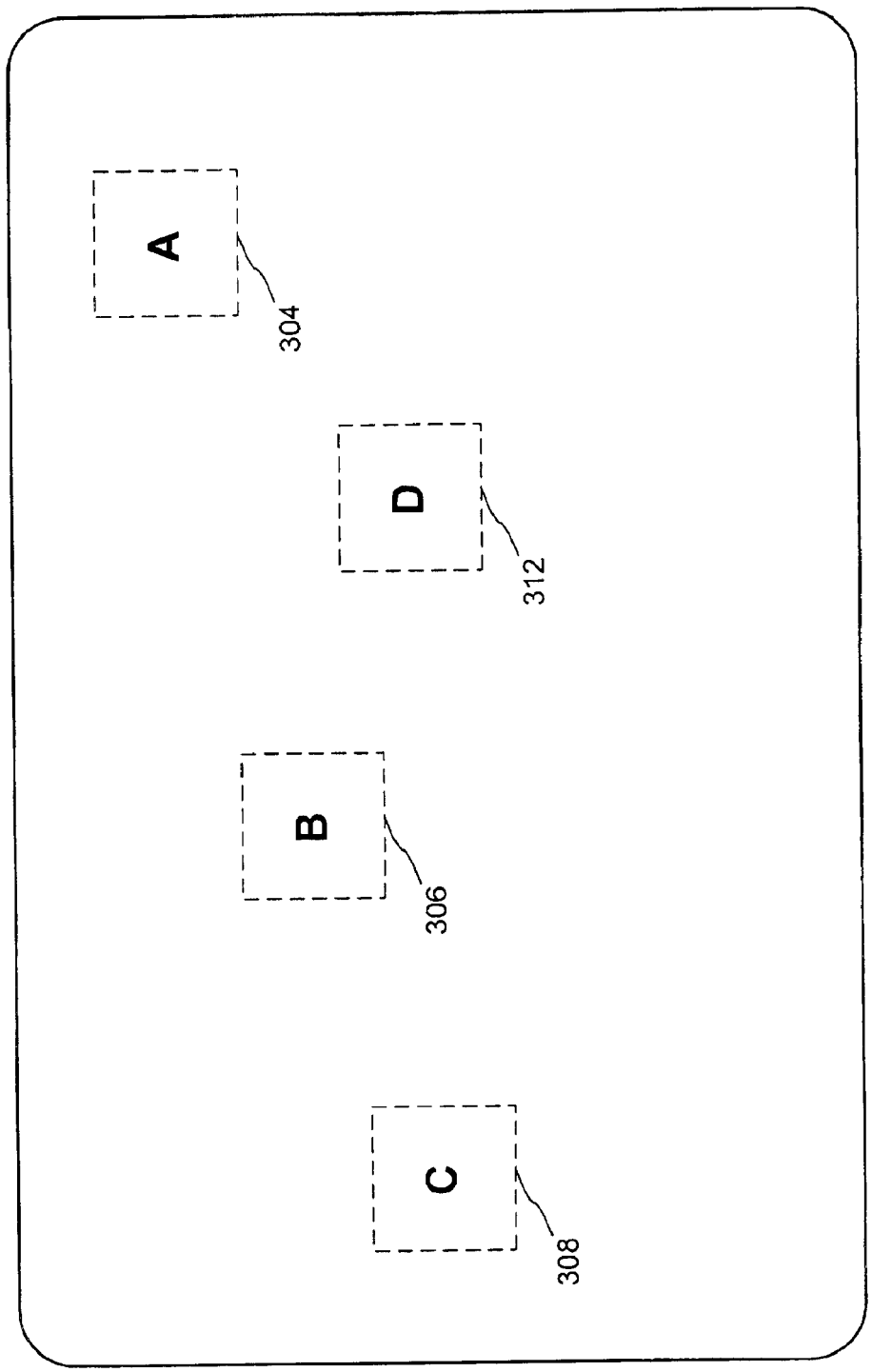
FIG. 3 shows a display region showing various displayed items.
Figure 4:
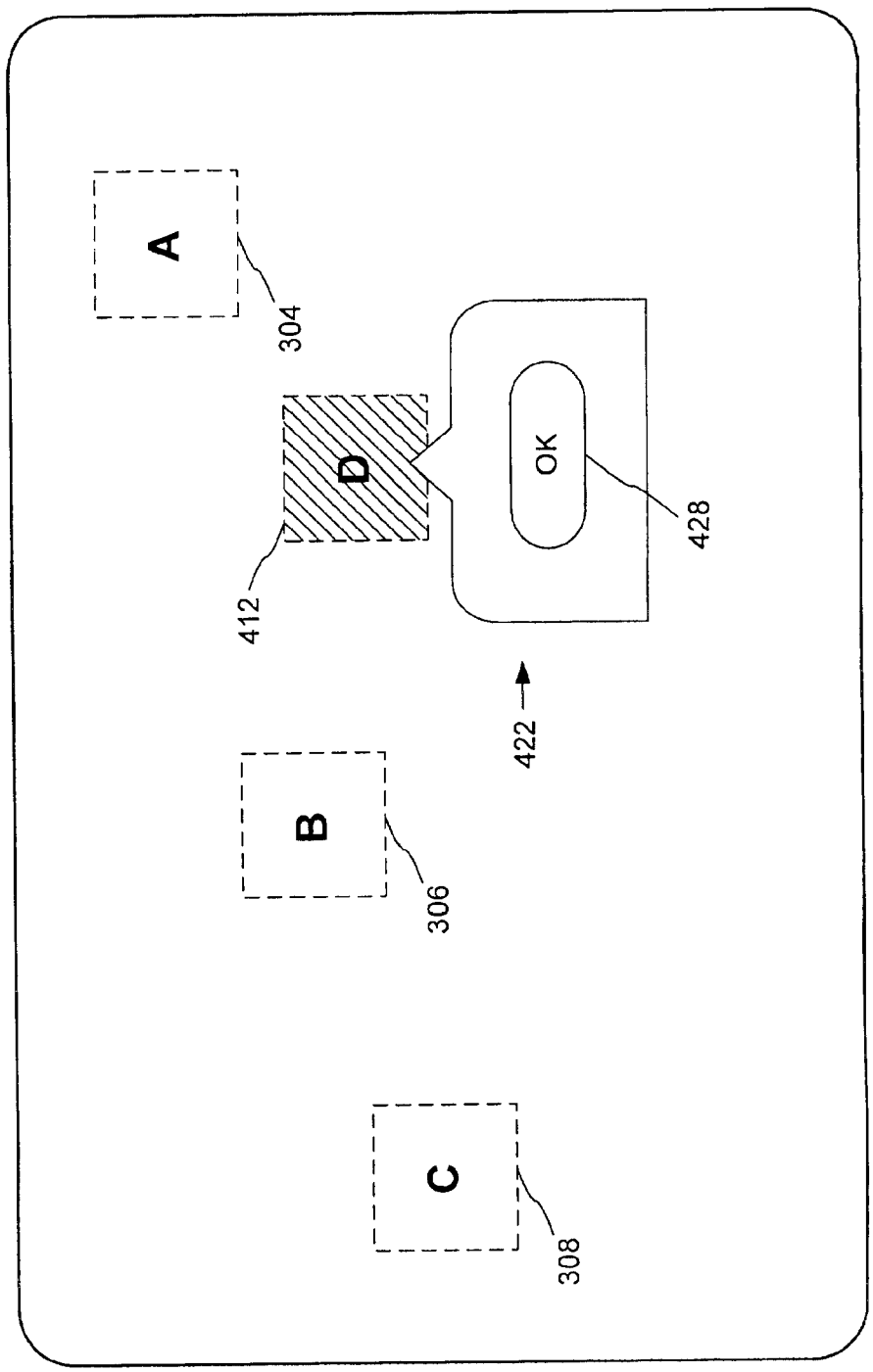
FIG. 4 shows the display region of FIG. 3 and a user interface element for selecting a displayed item.

FIGS. 3 and 4 show exemplary operation of a user interface element to select an item and perform an operation on the selected item.

FIG. 3 depicts a display area 300 of a user interface, such as a window in a computer's graphical user interface. The display area can also be depicted on a variety of other user interfaces, such as that presented by a television or hand-held device. Four items 304, 306, 308, and 312 are shown. The items can be used, for example, to represent abstract or real-world items.

At FIG. 4, a user interface element 422 is shown and has been moved about the display area to select the item 412, which is depicted as highlighted to indicate it has been selected. Upon activation of the area 428, an operation is performed on the selected item 412.

Exemplary Scenario for User Interface Element

Figure 5:
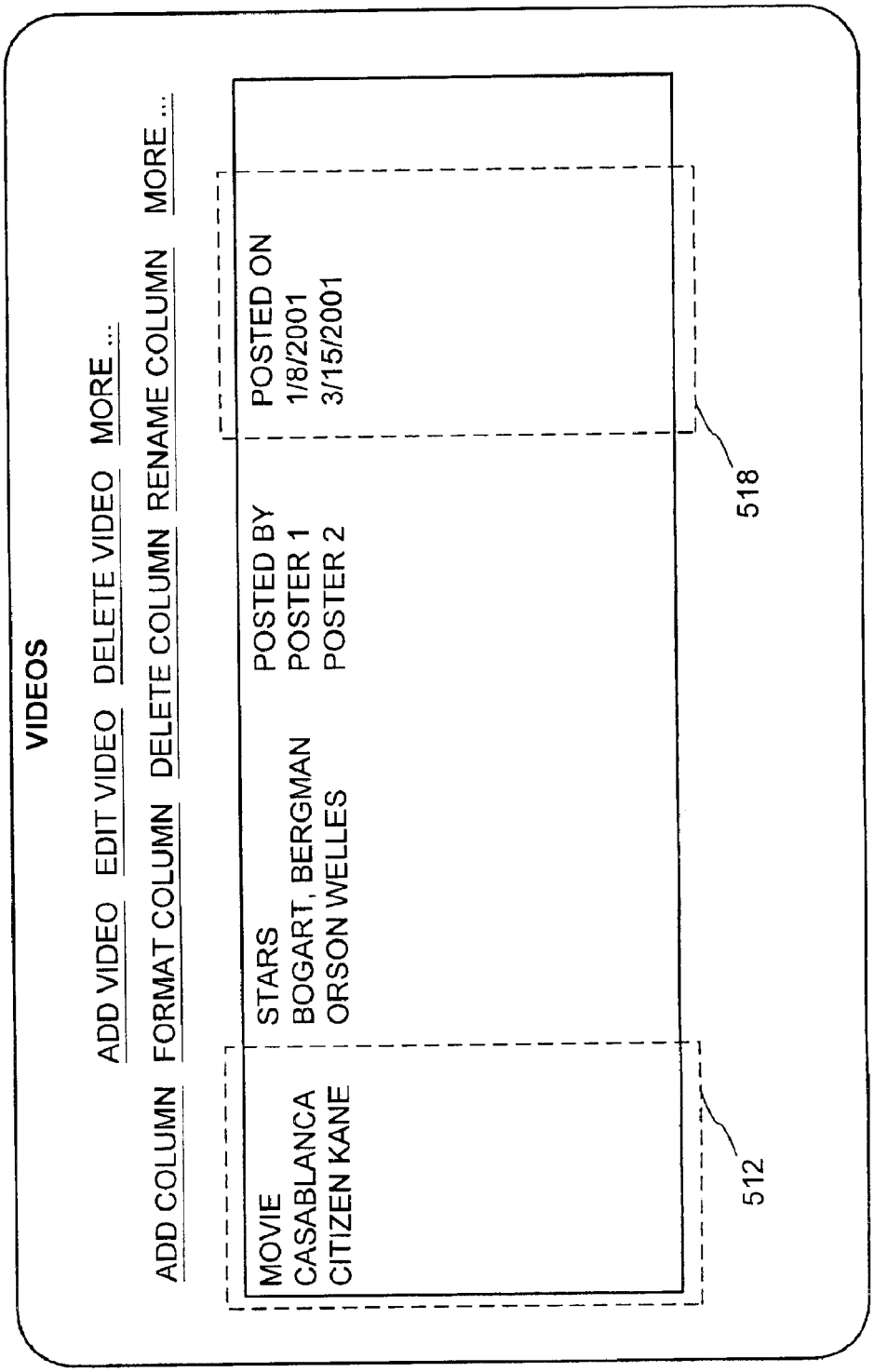
FIG. 5 is a display region showing a list.
Figure 6:
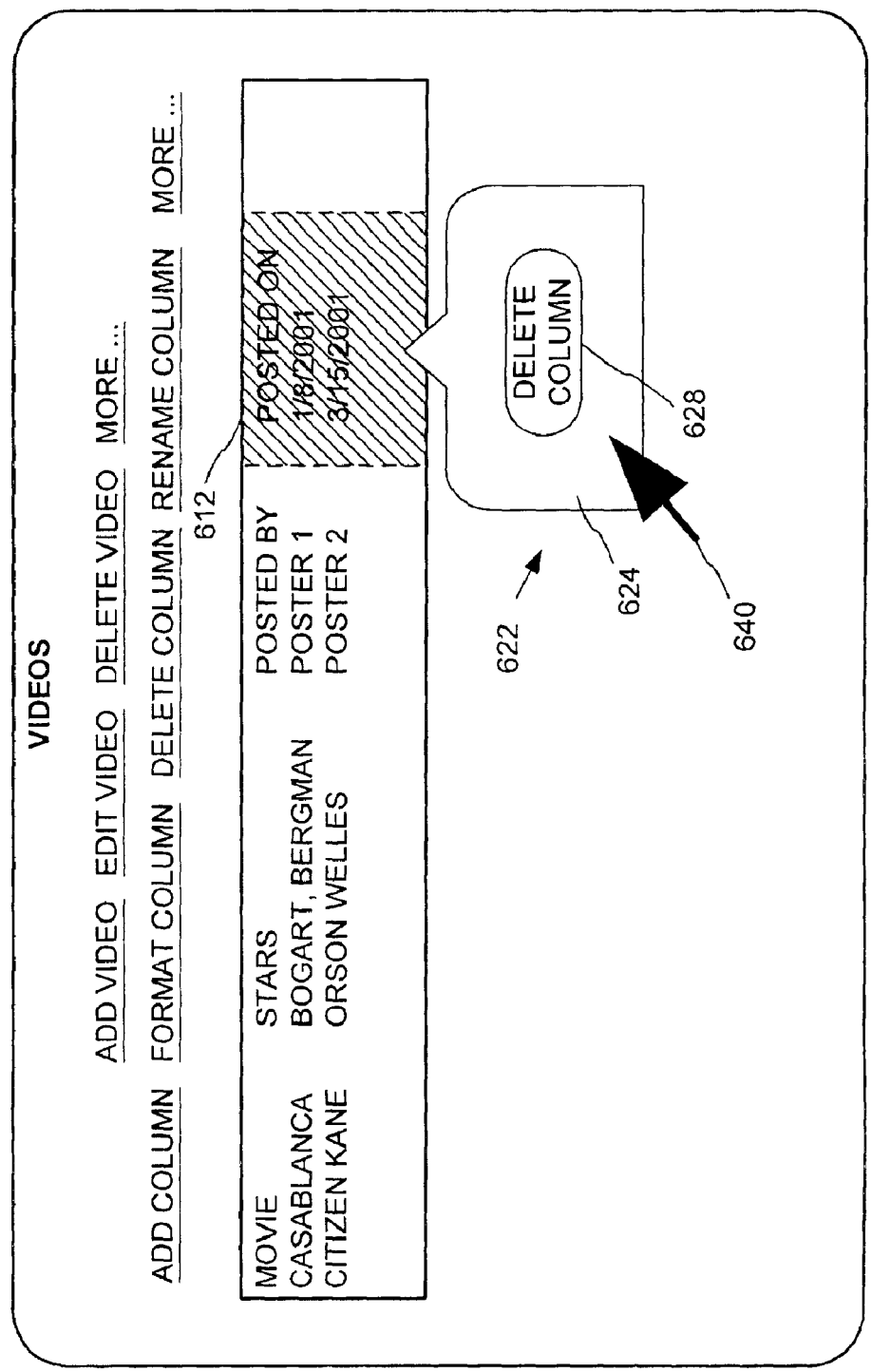
FIG. 6 is a display region showing a user interface element for deleting one of the columns in a list, such as that of FIG. 5.

FIGS. 5 and 6 illustrate an exemplary scenario for a user interface element. FIG. 5 shows a display area 502 that includes a list of videos as part of an online community devoted to a particular film genre. Two exemplary items 512 and 518 are columns in the list, which is presented as a table. Various user interface elements for performing operations on the list can be invoked by activating the appropriate area in the display area 502 (e.g., "Delete Column").

FIG. 6 shows use of a user interface element 622 in a display area 602. The user interface element 622 has been positioned by using a pointer 640 to drag (via the area 624) the element 622 to select the column 612, which is shown as highlighted to indicate it has been selected. Upon activation of the pushbutton 628, the column 612 is deleted.

Exemplary Types of User Interface Elements

FIGS. 7A, 7B, 8A, and 8B show a variety of types of user interface elements that can be applied, for example, for use in the scenario depicted in FIGS. 5 and 6.

Figure 7A:
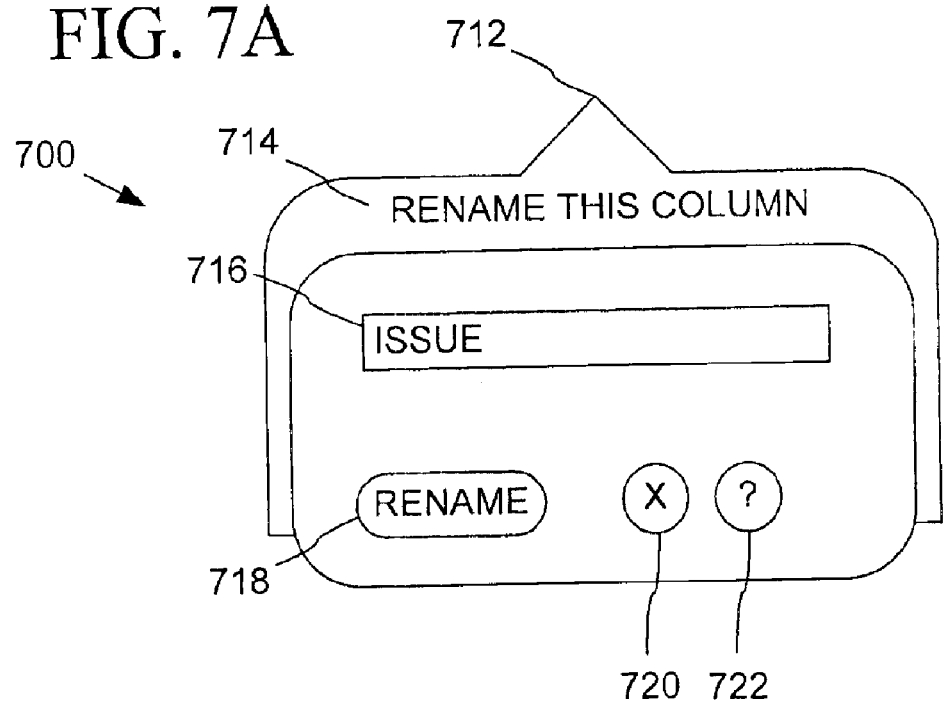
FIG. 7A is an illustration of a user interface element for renaming a column in a list.

FIG. 7A shows a rename user interface element 700. The user interface element can be identified by its name area 714. When the pointer 712 is positioned over a column, the text box 716 is updated to indicate the name of the column.

When the user is satisfied that the proper column has been selected and has changed the contents of the text box 716 to be the desired name of the proper column, the user can click on the rename pushbutton 718 to rename the column.

Two other buttons, a cancel button 720 and a help button 722 are provided. The cancel button dismisses the user interface element, and the help button provides further information to assist in operation of the user interface element.

Figure 7B:
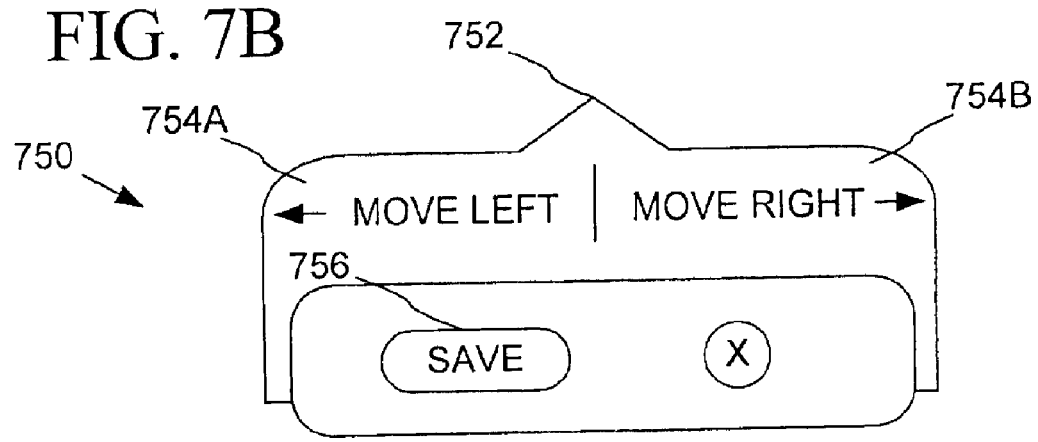
FIG. 7B is an illustration of a user interface element for moving a column in a list.

FIG. 7B shows a move column user interface element 750. The user interface element 750 can be used to move a column left or right by positioning the pointer 752 over the desired column and then activating the move left area 754A or the move right area 754B. The user interface element 750 can be configured to automatically move with the column. For example, if the column is moved to the left, the user interface element 750 automatically tracks the column and moves to the left with the column. The user interface element thus moves along with the column. Such an arrangement can be helpful when a column is being moved more than one position (e.g., two or three positions to the left).

When the user is satisfied that the columns are moved to their desired positions, the save button 756 can be activated to save the changes. The user interface element 750 can support multiple step operations in that multiple columns can be moved or a single column can be moved multiple positions before the save button 756 is pushed.

Performing multiple step operations need not be limited to moving columns. For example, multiple column rename operations could be performed via a user interface element for renaming column operations. Such a user interface element might have a save button similar to the save button 756.

Alternatively, the move column user interface element 750 could be implemented to immediately perform the column moves, rather than batching them as described above. In yet another arrangement, a user interface element 750 can be implemented so that the action is performed in response to detecting that the element 750 has been moved off the selected item. For example, multiple rename column operations could be performed by a user interface element that renames the column (e.g., to whatever name is specified via a text box within the element) when the element is dragged off a current column.

Figure 8A:
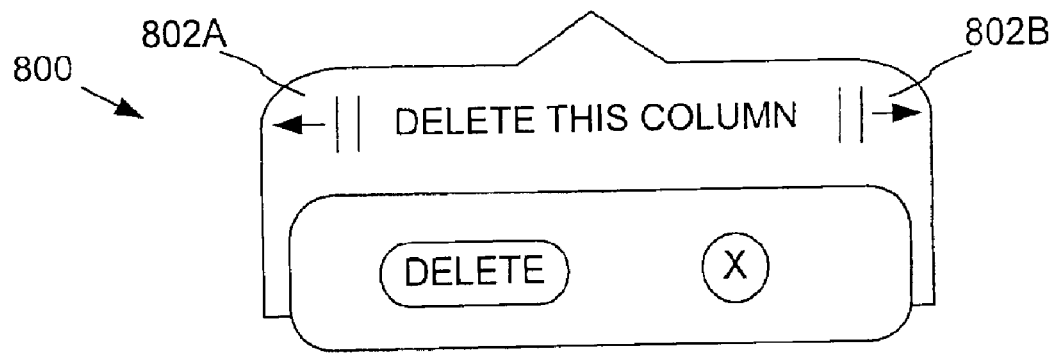
FIG. 8A is an illustration of a user interface element for deleting a column.

FIG. 8A depicts a delete column user interface element 800. The user interface element 800 is used to delete a column in a list. Two areas 802A and 802B are provided to automatically move the element 800 to the neighboring left or right column, respectively. For example, if a column is currently selected, pressing the area 802A causes the user interface element to move one column to the left and select the column. For other elements, a similar arrangement can be used to move to a next displayed item (e.g., in a logical order).

Figure 8B:
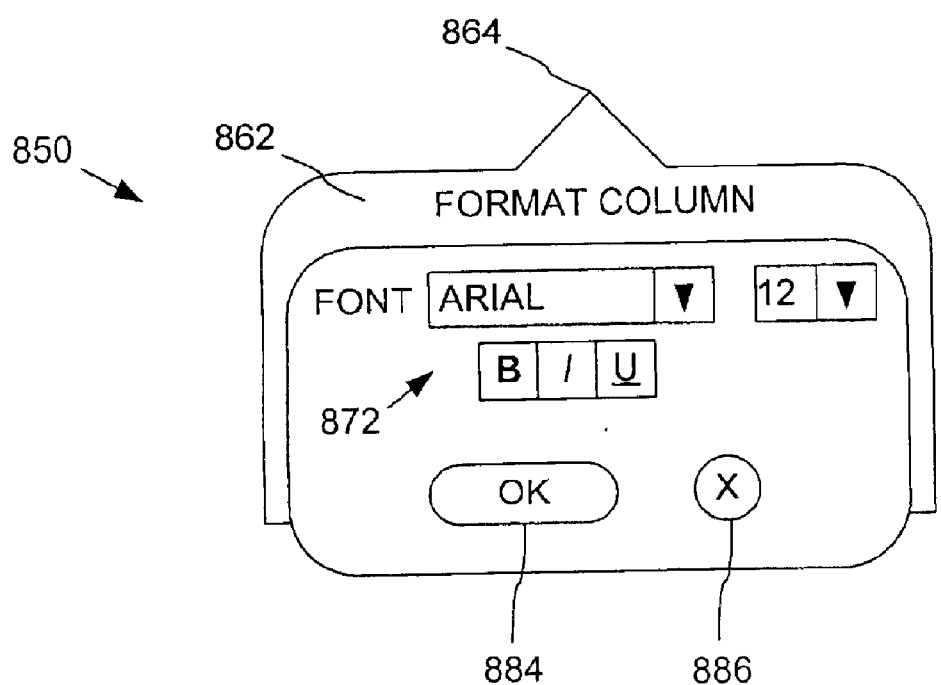
FIG. 8B is an illustration of a user interface element for formatting a column.

FIG. 8B depicts a format column user interface element 850, which is identified by and can be dragged via name area 862. When the pointer 864 of the format column user interface element 850 is positioned over a column, the formatting controls 872 are updated to reflect the formatting settings of the column. The user can then manipulate the formatting controls 872 to modify the formatting of the column. When the user is satisfied with the settings, the OK button 884 can be activated, or the formatting can be canceled and the element dismissed by clicking on the cancel button 886. An alternative format column user interface element includes a ruler (e.g., such as that displayed in a word processor program for setting tabs and margins) for formatting text.

To streamline processing, the format column user interface element 850 can be configured to not display information about a column until it has reached a standstill (e.g., when the user has completed a drag operation). For example, the user interface element 850 can be reduced in size to hide the formatting controls 872. The formatting controls 872 are thus not updated as the element is dragged about the display.

Although the above-described examples involve cases in which an operation is performed directly on a column, operations can also be performed with reference to a selected item. For example, an "add column" operation might not perform an operation on the selected column but rather add a column after or before the selected column. Alternatively, a "duplicate column" operation might duplicate (e.g., copy) an already-existing column.

The above user interface elements are meant to be exemplary only. A wide variety of others can be constructed in accordance with the invention. For example, a moveable displayed user interface element could be used to modify the properties of any displayed item. Such properties might include, without limitation, size, color, shape, name, location, settings, and the like.

Lightweight Selection System and Methods

Figure 9:
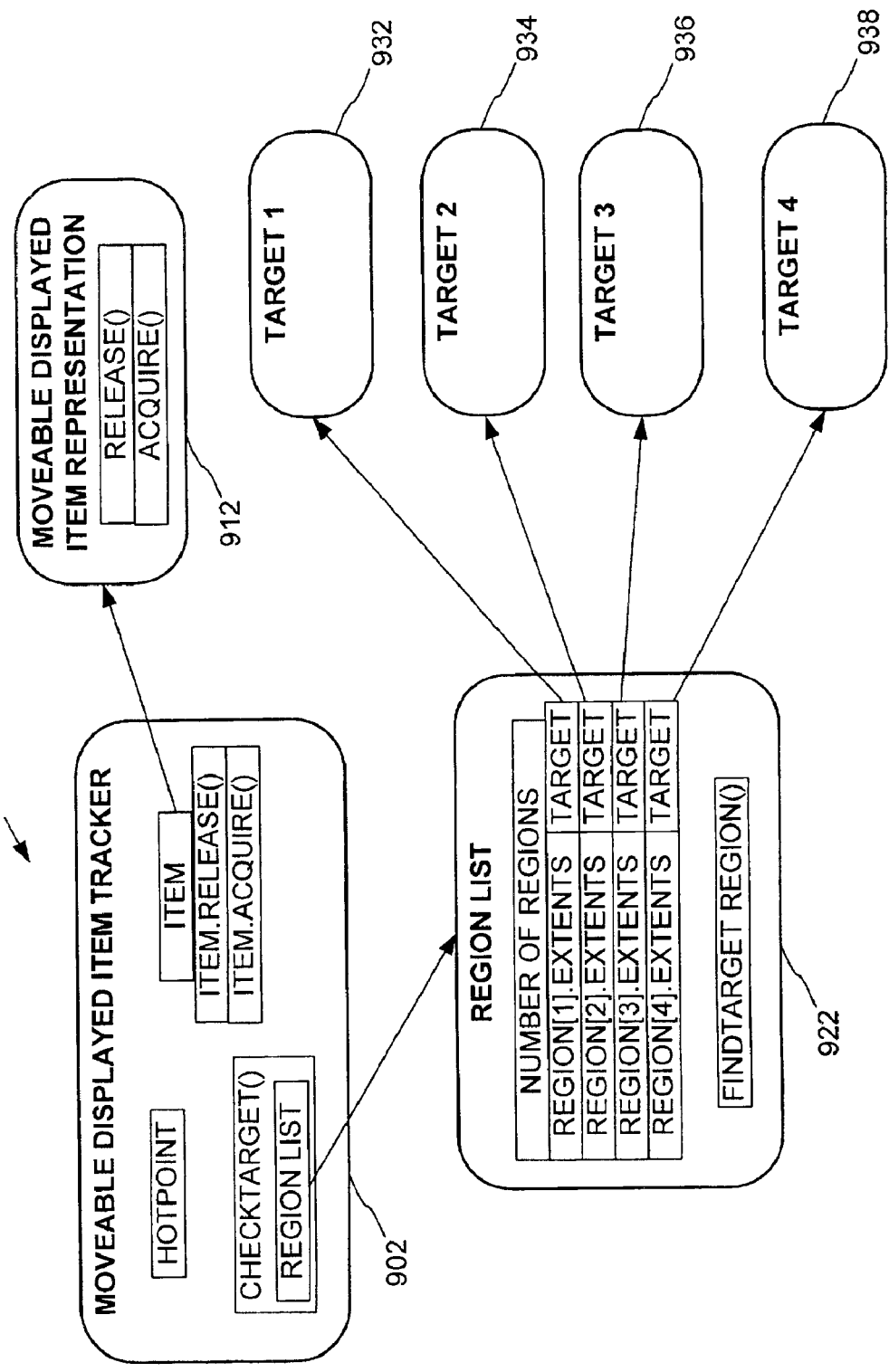
FIG. 9 is a block diagram of a system for determining when a moveable displayed item is positioned over any of a set of targets.

FIG. 9 shows a system 900 for providing selection of items displayed in a user interface. The system is sometimes called "lightweight" because selection of items can be determined by consulting a region list, rather than the items themselves. On a general level, the system 900 determines when a moveable displayed item is positioned over any of a number of specified displayed items in a graphical user interface. Although the lightweight selection system and methods can be used to implement the various examples above, it is a generic solution. Therefore, the system and method can be modified to address a variety of other scenarios.

In the system 900, items that can be selected are sometimes called "targets." Targets are selected whenever a moveable displayed item is positioned over a region associated with the target. Typically, a point on the moveable displayed item is designated a hot point. Whenever the hot point is within a region, the associated target is considered selected.

An internal representation 902 of the moveable displayed item is typically a software object having various data members and member functions. The software object can be constructed in any of a number of software development environments. In the example, the software objects are constructed via the JAVASCRIPT programming language of Sun Microsystems.

The software object 902 for tracking the moveable displayed item includes a hot point, which specifies a point (e.g., a pixel) that is used to determine when the moveable displayed item is positioned over one of the targets. The software object 902 also includes a reference to a representation 912 of the moveable displayed item and a reference to acquire and release functions of the representation 912 that are invoked when the moveable displayed item is moved into (i.e., "acquires") or out of (i.e., "releases") a target. The functions are sometimes called "call backs" because the actual functionality typically resides in another object. Such an arrangement is advantageous because the software object 902 is an object that invokes generic acquire and release functionality. Details of the acquire and release are handled elsewhere (e.g., via a region list) and thus can be customized more easily. Objects representing or tracking the moveable displayed item need only handle invoking the acquire and release functionality, rather than implementing it.

The software object 902 further includes a function CheckTarget( ), which can be invoked when the moveable displayed item is moved to determine whether the moveable displayed item is over a target and invoke the appropriate acquire function when it is determined that the moveable displayed item has selected or deselected a target. For example, CheckTarget( ) can consult the region list and the hot point to determine over which region the moveable displayed item is located. Then, the selected target is determined by finding which target is associated with the region. As a result of a change in target status (e.g., a different target is now selected), the appropriate release or acquire functionality is invoked for the target.

The software object 902 further includes a reference to a region list, which is represented by a region list object 922. The region list object 922 includes a list of regions. For each region, the extents of the region (e.g., the area of the display considered to be within the region) and a reference to a target associated with the region is specified. The reference to the region list can be encapsulated in the CheckTarget( ) functionality. Thus, the region list handles the details relating to what happens when the moveable user interface enters a region. The region list is sometimes called "pluggable" because a new region list can be swapped for the current one while maintaining the object 902.

The region list object 922 also includes a member function FindTargetRegion( ), which, given a point on the display, can determine within which region, if any, the point lies. Typically, the regions are specified by rectangles, but a non-rectangular system can be used.

By supporting the "acquire target" and "release target" functions, the system and methods support a wide variety of implementations, including moveable displayed interface elements that are modified as they enter and leave other displayed items. The region and target arrangement supports a level of indirection in that the displayed regions may refer to a different item (e.g., a displayed region may be the word "all" and entering the region activates a target that selects all designated displayed items).

An advantage of the illustrated arrangement is that selection of a target can be determined by consulting a single object (i.e., the region list object 922), rather than consulting each of the targets 932, 934, 936, and 938. Another advantage is that a single object can be more easily updated when the extents of one or more targets change. Changes in the individual targets that make up a region list can be more quickly applied to determine new extents of a target.

Figure 10:
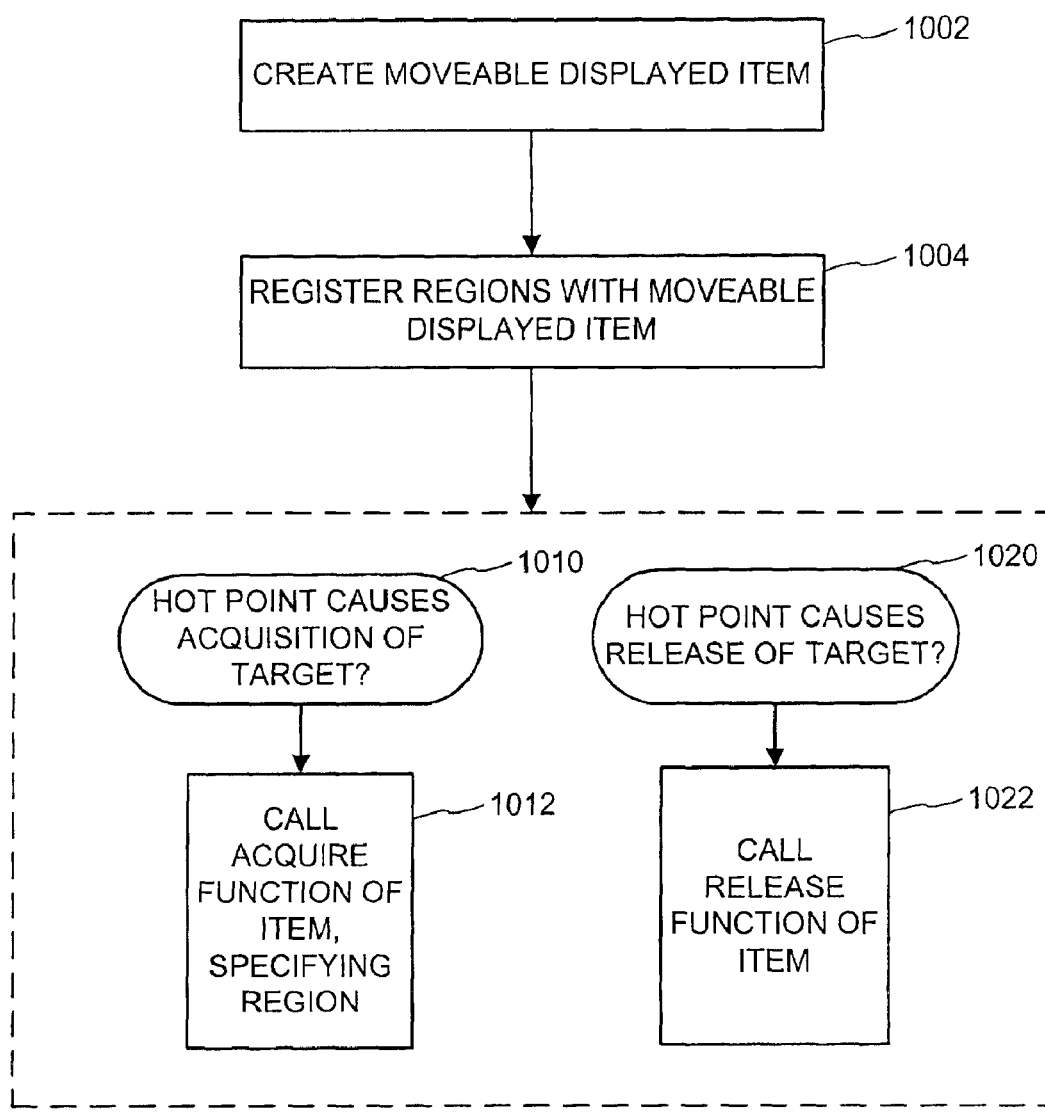
FIG. 10 is a flowchart showing an exemplary method for use in determining when a moveable displayed item is positioned over any of a set of targets.

A method for use in conjunction with the system 900 is shown in FIG. 10. At 1002, a moveable displayed item is created. A hot point for the item can be specified or a default one chosen. At 1004, various regions (e.g., associated with the targets) are registered with the moveable displayed item by constructing a region list for the moveable displayed item. Call back functionality can also be designated at this time.

At 1010, if it is determined the hot point associated with the moveable displayed item has indicates acquisition of a target (e.g., the hot point has entered a different region), at 1012, the acquire function of the moveable item (e.g., calling back to functionality of the region list) is invoked, and the particular region the displayed item has entered is provided to the acquire function. The region is typically associated with a particular target. 1010 can be implemented by a call to the FindTargetRegion( ) method of the region list object 922 (FIG. 9). In this way, selection can be determined without having to consult the individual potential targets. If there are many potential targets, such an approach can be considerably more efficient. The FindTargetRegion( ) method can be invoked by a member function CheckTarget( ) described above. One way of determining whether the hot point has entered a region is to check if the target associated with the current region is different from the target when last checked.

At 1020, if it is determined that the hot point indicates release of a target (e.g., the hot point has moved outside a region), at 1022, the release function of the moveable item (e.g., calling back to functionality of the region list) is invoked. Again, 1020 can be accomplished by consulting the region list object, rather than each of the individual potential targets.

Various other features can be incorporated into the lightweight selection system and method. For example, a set of functions can be specified that are called when an items begins or completes moving (e.g., when dragging begins and when dragging stops). Such functions allow for the modification of a moveable item while it is being moved. For example, it may be desirable to hide some detail of a moveable item while moved to improve performance.

Implementation of User Interface Elements Via Lightweight Selection System

The above-described lightweight selection system and methods can be used in a variety of scenarios and is particularly useful for implementing the above-described moveable displayed user interface elements. For example, a user interface element can be designated as a moveable displayed item, and a region list can be constructed to indicate each of the possible targets. When the user interface element is moved over one of the targets, a function is invoked to pass information about the associated region (and thus a reference to the target) to a software object associated with the user interface element. At such time, the software object associated with the user interface element can take any of a number of actions, including making a notation of the target over which the user interface element has been positioned.

To avoid excessive page recalculations and rendering, the passed information can be used to generate a highlighted region. The highlighted region can be presented in a variety of ways but is typically positioned over a target by denoting (e.g., filling) a region's extents with a particular color or graphic emphasis.

Subsequently, when the activation area of the user interface element is activated, a software object associated with the user interface element can perform its particular operation, with reference to the target associated with the region over which the user interface element has been positioned.

Further Details of an Implementation of a User Interface Element

Figure 11:
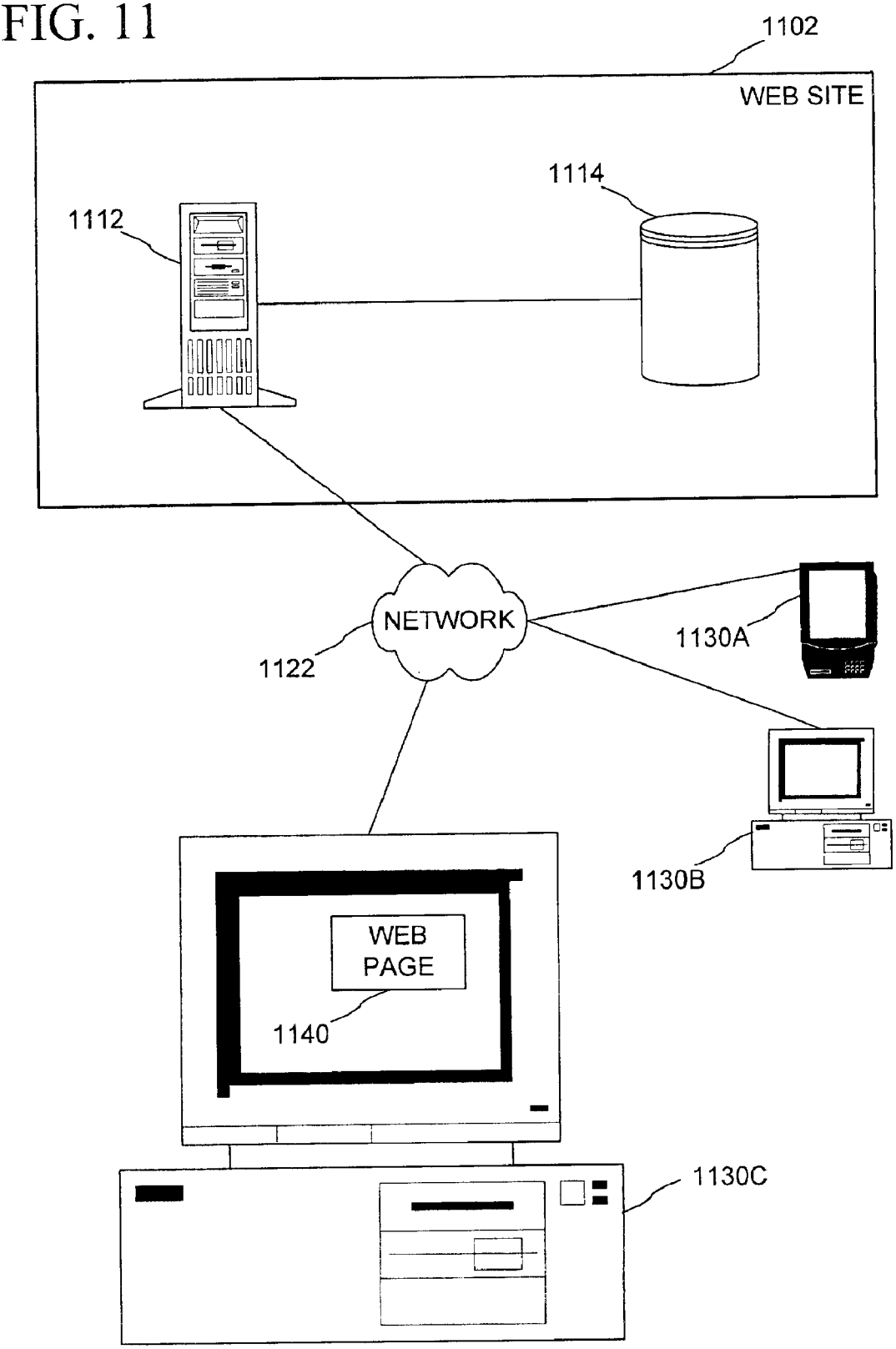
FIG. 11 is a block diagram showing an exemplary environment for implementing the described user interface elements.

FIG. 11 shows one of many environments suitable for an implementation of the invention. The environment includes a web site 1102 comprising a web server 1112, which accesses a database 1114. Typical web sites include a more complex arrangement in which several web servers access a plurality of databases hosted by a plurality of database servers.

The web site 1102 is accessed via a network 1122 (e.g., the Internet) by various devices 1130A, 1130B, and 1130C having a web-browsing capability. For example, the desktop computer 1130C presents a web page 1140 on its display device. The web page 1140 is typically presented by software called a web browser.

The depicted devices include computer-readable media such as a hard disk to provide storage of data, data structures, computer-executable instructions, and the like. Although the description of computer-readable media above refers to a hard disk, other types of media which are readable by a computer, such as a removable magnetic disks, CDs, magnetic cassettes, flash memory cards, digital video disks, and the like, may also be used in the exemplary operating environment.

In the illustrated example, a moveable displayed user interface element is implemented in Dynamic Hypertext Markup Language ("DHTML"). DHTML is a hypertext markup language supporting various features for building dynamic graphical user interfaces.

Figure 12:
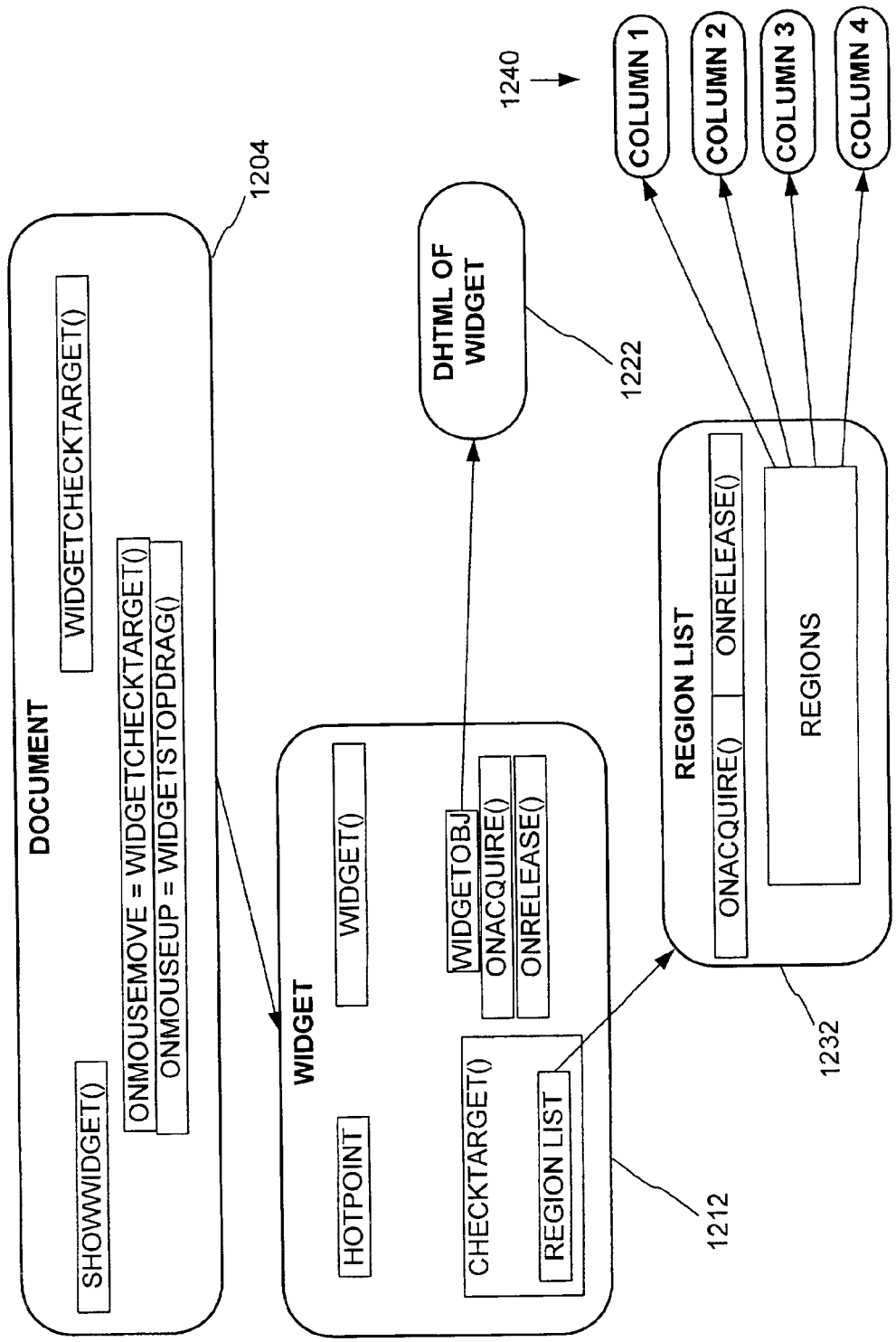
FIG. 12 is a block diagram showing an exemplary implementation of the described user interface elements in a DHTML environment.

FIG. 12 is a block diagram showing details of one particular implementation of moveable displayed user interface elements, which are called "widgets" in the example. The document object 1204 is a DHTML document presented by a web browser and includes various functions created in the JAVASCRIPT programming language of Sun Microsystems. The showWidget( ) function can be invoked (e.g., via a call to "javascript:showWidget('delete_column')") to display a widget for performing any of a variety of functions. In the example, the showWidget( ) function determines the appropriate targets for a widget and builds the region list object described below. One way of providing a way to invoke the showWidget( ) function is by including it in the "HREF" field of a link embedded in a displayed web page.

The widgetCheckTarget function checks to see if a widget is over a list of specified targets. When the pointer is moved about the web page, the onmousemove function of the document object 1204 is invoked. In the illustrated example, the onmousemove function is set to "widgetCheckTarget( )." When the pointing device's button is released, the onmouseup function of the document object 1204 is invoked. In the illustrated example, the onmouseup function is set to "widgetStopDrag( )."

The widget object 1212 is used to represent a widget, and includes a checkTarget( ) function, which can be invoked by the above widgetCheckTarget( ) function to determine whether the widget is over any of a set of specified targets. The widget( ) function is a constructor that builds a widget object 1212 upon receipt of a region list, the DHMTL of the widget 1222, a hot point, an acquire function, a release function, and other information.

The hot point is an X,Y coordinate specifying a point within the widget (e.g., a tip of the widget). When the hot point is over a target, the widget selects the target.

The widgetObj refers to the DHTML of the widget 1222. DHTML supports an element called "DIV," which specifies a container that renders HTML. The widget can be rendered via a DIV element. The onacquire( ) and onrelease( ) functions are invoked when the widget acquires or releases a target, respectively. Typically, these two functions call back to functionality via the region list object 1232, described in more detail below. When the widget acquires a target, the widget object 1212 can store information about the target. Subsequently, when the button associated with the widget is pressed, the widget object 1212 can perform an appropriate operation on the target. For example, in the DHTML of the widget 1222, an HTML form can include a submit button which invokes an appropriate command on a web server (e.g., the web server 1112 of FIG. 11). Thus, for example, an item stored at a server can be modified by directing an appropriate command, including modification information, to the server when the submit button is pressed.

The widget object 1212 also refers to a region list object 1232, which contains a list of regions 1240, references to associated targets, and functionality for acquiring and releasing targets. In the example, the regions 1240 are columns in a table, but other shapes with another set of extents could be used. The region list object 1232 includes the display extents of the regions, so that it can easily be determined whether a widget's hot point is over a region. In the example, the extents are specified as a set or sets of rectangular coordinates.

When the showWidget( ) function is activated, the function checks to see if a widget of the specified type has already been created and can thus be reused. If so, a new region list may need to be swapped in, but the same widget can be reused. If a widget is not already created, the function builds the widget by constructing the proper DHTML for it, including, for example, an HTML form which sends an appropriate command back to a web server when activated. After use, the widget can be hidden via its "visible" property. The "innerHTML" feature of DHTML can be used to add the widget to the DHTML already displayed (e.g., by substituting the constructed DHTML of a widget for an empty "DIV" element in the document). Upon selection of one of the targets, a rectangle over the appropriate region can be set to an opaque color to indicate the region has been selected.

Using the User Interface Elements to Customize a Web Page

A particularly useful scenario for the above-described moveable displayed user interface elements is web page customization. For example, if the display region of FIG. 5 is the rendered version of a web page stored at a server, the moveable displayed user interface elements can be presented at a client computer and used to customize (e.g., format) the page according to a user's preferences. The user can thus select items appearing in the rendered version of the web page and modify the data stored at the server that is used to render the web page.

Thus, an easy-to-understand interface for editing web pages is presented. If web pages are stored at a server, appropriate commands (e.g., formatting commands) are directed to the server so that presentation of the page is modified.

Customization of the web page can include deletions. For example, if a web page has a table with columns, a displayed user interface element (e.g., element 800 of FIG. 8A) can be positioned to select the column and the "delete" button pressed. Responsive to the delete button's being pressed, a directive is sent back to the server to delete the column from the presentation of the web page.

Such an approach is superior to an approach wherein the user indicates a delete command, and an additional mechanism (e.g., checkboxes) is inserted into the web page to indicate which column is to be deleted. In such a case, the web page must be redisplayed before the user can choose which column is to be deleted.

Alternatives

Having described and illustrated the principles of our invention with reference to illustrated embodiments, it will be recognized that the illustrated embodiments can be modified in arrangement and detail without departing from such principles. Although one of the illustrated embodiments involves operations performed on a list in table form, the principles of the architecture can be applied to a wide variety of scenarios involving displayed user interfaces. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of presenting a computer user interface for performing an action on a selected displayed item out of a plurality of displayed items, the method comprising:

presenting a moveable displayed user interface element comprising an area displayed within the user interface element for receiving an activation;

responsive to detecting that a pointer of the user interface element is over a displayed item, selecting the displayed item; and responsive to receiving an activation of the area displayed within the user interface element, causing the action to be performed on the selected displayed item.

2. The method of claim 1 wherein the selecting comprises highlighting the displayed item.

3. The method of claim 1 wherein the moveable displayed user interface element comprises at least one user interface element within the displayed user interface element.

4. The method of claim 3 wherein the at least one user interface element within the displayed user interface element comprises a button.

5. The method of claim 3 wherein the at least one user interface element within the displayed user interface element comprises a button for confirming the action and a button for canceling the action.

6. The method of claim 3 wherein the at least one user interface element within the displayed user interface element comprises a button and a text box.

7. The method of claim 6 wherein the text box is updated to indicate information about a displayed item when the displayed user interface element moves over the displayed item.

8. The method of claim 1 wherein the computer user interface comprises a displayed pointer separate from the moveable displayed user interface element, the method further comprising:

responsive to determining the moveable displayed user interface element is being dragged by the displayed pointer, repositioning the moveable displayed user interface element.

9. The method of claim 1 further comprising:

responsive to detecting that the user interface element is over a displayed item, displaying information about the displayed item.

10. The method of claim 9 wherein the information about the displayed item is displayed within the moveable user interface element.

11. The method of claim 10 further comprising:

accepting a modification of the information; and modifying the displayed item in accordance with the accepted modification.

12. The method of claim 10 further comprising:

accepting a modification of the information; and sending the modification to a server computer for processing.

13. The method of claim 1 further comprising:

responsive to detecting that the user interface element is over one of the displayed items, displaying properties of the displayed item.

14. The method of claim 1 wherein the item appears in the rendered version of a web page stored at a server; and the action modifies information for presenting the web page stored at the server.

15. The method of claim 1 wherein
a description of the action is presented within the moveable displayed user interface element.

16. The method of claim 1 wherein
a description of the action is presented within the area displayed within the user interface element.

17. The method of claim 16 wherein
the description comprises a text description of the action.

18. The method of claim 17 wherein
the description comprises the word 'delete.'

19. The method of claim 1 wherein the action comprises moving the displayed item, the method further comprising:
responsive to receiving the activation, moving the moveable displayed user interface element along with the item.

20. A moveable displayed user interface element for performing an operation on a set of one or more items out of a plurality of items displayed on a display as part of a user interface, the moveable displayed user interface element operable to cause selection of the set of one or more items as the element is moved about the display and a pointer of the element is moved over the set of one or more items, the user interface element comprising:
at least one area of the user interface element which is designated for receiving an activate indication from a user to initiate the operation on the selected set of one or more items.

21. The moveable displayed user interface element of claim 20, wherein the moveable displayed user interface element is operable to be moved by being dragged by a displayed pointer.

22. The moveable displayed user interface element of claim 20 further comprising an area indicating a name of the operation initiated on the selected set of one or more items.

23. The moveable displayed user interface element of claim 20 wherein
the display comprises a window presented by an Internet browser; and
the moveable displayed user interface element causes selection of items displayed within the window presented by the Internet browser.

24. The moveable displayed user interface element of claim 20 wherein the moveable displayed user interface element further comprises a separate drag area for moving the moveable displayed user interface element about the display.

25. The displayed user interface element of claim 20 wherein the display comprises a table, and the plurality of items comprises columns in the table.

26. The displayed user interface element of claim 20 wherein the area designated for receiving an activate indication is a displayed button.

27. The displayed user interface element of claim 20 further comprising:
an area which is designated for canceling the operation upon activation.

28. The displayed user interface element of claim 20, further comprising:
an area which is designated for saving the operation upon activation.

29. The displayed user interface element of claim 20, wherein the operation comprises a plurality of steps.

30. The displayed user interface element of claim 20 wherein the operation is a delete operation.

31. The displayed user interface element of claim 20 wherein the operation is a move operation.

32. The displayed user interface element of claim 20 wherein the operation is a format operation.

33. The displayed user interface element of claim 20 wherein the operation is a buy operation.

34. The displayed user interface element of claim 20 wherein the operation is a spellcheck operation.

35. The displayed user interface element of claim 20 wherein the operation is a get information operation.

36. The displayed user interface element of claim 20 further comprising an area operable to cause the displayed user interface element to move to a displayed item neighboring a currently-selected displayed item.

37. The displayed user interface element of claim 20 further comprising an area operable to cause the displayed user interface element to move from a currently-selected displayed item to a displayed next item.

38. The displayed user interface element of claim 20 further comprising:
a display area for presenting information about a selected item.

39. The displayed user interface element of claim 38 wherein the information about the selected item is editable to modified the selected item.

40. The displayed user interface element of claim 38 wherein the display area for presenting information about a selected area is inhibited during movement of the user interface element.

41. The displayed user interface element of claim 38 wherein the display area automatically updates information about the selected item when the item is selected.

42. The displayed user interface element of claim 41 wherein the information about the selected item comprises a property of the selected item.

43. The displayed user interface element of claim 41 wherein the information about the selected item comprises formatting information about the selected item.

44. The displayed user interface element of claim 41 wherein the information about the selected item comprises a name of the selected item.

45. A moveable displayed user interface element operable to select an item displayed on a user interface, the moveable displayed user interface element comprising:
a hot point operable to cause selection of the item when the hot point is moved over the item;
a display area comprising a name of an operation;
a button for receiving an indication that the operation is to be performed on the item selected, the button at least partly comprising an area of the moveable displayed user interface other than the hot point.

46. The moveable displayed user interface element of claim 45 wherein the moveable displayed user interface element is implemented as a DHTML DIV element.

47. A user interface displayed on a display, the user interface comprising:
means for selecting a displayed item displayed on the display when a hot point of a moveable displayed user interface element is moved over the displayed item; and
on the moveable displayed user interface element at a location other than the hot point, displayed means for receiving an activation indication to perform an operation on the selected item.

48. The method of claim 1 wherein at least two displayed items are selected, and wherein responsive to receiving an activation further comprises causing the action to be performed on the at least two displayed items.

49. The method of claim 1 wherein detecting that the user interface element is over a displayed item comprises detecting that any portion of the user interface element is over the displayed item.

50. The method of claim 1 wherein the moveable displayed user interface element comprises a hot point and wherein detecting that the user interface element is over a displayed item comprises detecting that the hot point is over the displayed item.

51. The method of claim 50 wherein the hot point location can be specified by a user.

52. The method of claim 1 wherein the displayed item comprises a reference area and wherein detecting that the user interface element is over a displayed item comprises detecting that the moveable displayed user interface element is over the reference area.

53. The method of claim 52 wherein the reference area is larger than the displayed item.

54. The method of claim 52 wherein the reference area is smaller than the displayed item.

55. The method of claim 1 further comprising:
  responsive to detecting that the user interface element has moved off a displayed item, releasing the displayed item.

56. A computer-readable medium comprising computer-executable instructions for performing the method of claim 1.

57. A computer-readable medium comprising computer-executable instructions for presenting the moveable displayed user interface element of claim 20.

58. A method of presenting a computer user interface for performing an action on a displayed item out of a plurality of displayed items, the method comprising:

presenting a moveable displayed user interface element comprising a portion of the displayed user interface element configured to achieve selection and an area displayed within the user interface element for receiving an activation at a location other than the portion configured to achieve selection; and responsive to receiving an activation of the area displayed within the user interface element, causing the action to be performed on a displayed item under the portion of the moveable displayed user interface element configured to achieve selection.

59. The method of claim 58, wherein the portion comprises a plurality of X,Y coordinates.

60. The method of claim 59, wherein each of the coordinates is a hot point.

* * * * *